United States Patent
Bellens et al.

(10) Patent No.: US 7,512,776 B2
(45) Date of Patent: Mar. 31, 2009

(54) OPTIMIZED CONTROL PLANE SIGNALLING FOR A HIGH AVAILABILITY NETWORK DEVICE IN A COMMUNICATIONS NETWORK

(75) Inventors: Arnaud Bellens, Ottawa (CA); James Michael Schriel, Kanata (CA); Mark R. Megarity, Ottawa (CA)

(73) Assignee: Alcatel Lucent, Paris (FR)

( * ) Notice: Subject to any disclaimer, the term of this patent is extended or adjusted under 35 U.S.C. 154(b) by 403 days.

(21) Appl. No.: 11/367,414

(22) Filed: Mar. 6, 2006

(65) Prior Publication Data
US 2007/0208927 A1    Sep. 6, 2007

(51) Int. Cl.
*H04M 3/00*    (2006.01)
(52) U.S. Cl. ............................. 713/1; 379/279; 379/269; 700/82; 700/3; 713/2
(58) Field of Classification Search ...................... 713/1, 713/2; 379/279, 269; 700/82, 3
See application file for complete search history.

(56) References Cited

U.S. PATENT DOCUMENTS

| | | | | |
|---|---|---|---|---|
| 6,253,266 | B1* | 6/2001 | Ohanian | 710/301 |
| 6,910,148 | B1* | 6/2005 | Ho et al. | 714/4 |
| 6,983,294 | B2* | 1/2006 | Jones et al. | 707/202 |
| 7,058,170 | B2* | 6/2006 | Brocco et al. | 379/279 |
| 2002/0169794 | A1* | 11/2002 | Jones et al. | 707/204 |
| 2002/0196805 | A1* | 12/2002 | Brocco et al. | 370/461 |
| 2004/0078619 | A1* | 4/2004 | Vasavada | 714/4 |
| 2004/0255186 | A1* | 12/2004 | Lau | 714/6 |
| 2005/0265346 | A1* | 12/2005 | Ho et al. | 370/392 |

* cited by examiner

*Primary Examiner*—Abdelmoniem Elamin (57) ABSTRACT

A method for resetting a component of an off-card assembly in a redundant system, the redundant system having first and second control plane cards coupled to the off-card assembly by respective serial interfaces, each serial interface including a respective status line and a respective clock line, each status line for providing a respective activity indication and a respective reset instruction, each clock line for providing a respective clock signal, the method comprising: monitoring respective activity indications and clock signals from the first and second control plane cards by the off-card assembly to determine which of the first and second control plane cards is an active card; and, selecting the reset instruction from the active card to reset the component, thereby resolving any conflict between respective reset instructions.

22 Claims, 4 Drawing Sheets

OPTIMIZED CONTROL PLANE SIGNALLING FOR A HIGH AVAILABILITY NETWORK DEVICE IN A COMMUNICATIONS NETWORK

FIELD OF THE INVENTION

This invention relates to the field of control plane management, and more specifically, to a method and system for optimizing the performance of control plane signaling in high availability network devices such as routers.

BACKGROUND OF THE INVENTION

In packet-switched networks, a router is a network device or, in some cases, software in a computer, that determines the next network point to which a packet should be forwarded toward its destination. The router is connected to at least two networks and decides which way to send each information packet based on its current understanding of the state of the networks it is connected to. A router is located at any gateway where one network meets another and is often included as part of a network switch.

Typically, packets are transported through a router by hardware and software operating in a data plane which is in turn controlled by hardware and software operating in a control plane. In general, the control plane includes the hardware and software that handles non-wire speed functions and data that are required to operate a network device or network. These functions include connection, setup, and tear down, operations, administration, and management. In general, the data plane includes the hardware and software that handles the classification, modification, scheduling, and transmission of wire-speed application data. The control and data planes maybe combined into a single processing plane.

To improve availability, a router may be equipped with redundant or two control, data, or processing planes. A first control plane, for example, is designated as the active control plane and a second control plane is designated as the inactive control plane. In the event that a device in the active control plane fails, the inactive control plane takes over to reduce down time and hence maintain availability of the router. In such a case, activity is said to switch from the active control plane to the inactive control plane, that is, the two planes exchange roles. Routers and other network devices having redundant systems (i.e., control or data plane devices) are often referred to as "high availability" systems. Thus, a typical high availability router may have two main processing cards that run the same software and perform the same operation. If one card fails in the field, the other card takes over in order to keep the router up and running. Such a router is highly available as the card redundancy ensures that the router is almost always operable or available.

Thus, in a redundant or high availability system, two redundant control planes or cards typically run the same software as mentioned above. Even if both control plane cards are running, the system is still one system and therefore only one control card can configure and operate the system. This one card is the active card. The other card remains in a standby mode monitoring what is going on within the system. It is the inactive card. If the active card fails, then the inactive card takes over and becomes the active card. This is an activity switch. An activity switch can occur due to a failure of the active card, but it is also possible to trigger an activity switch by removing the active card from the system to perform an upgrade, for example. An activity switch may also be generated by entering a software command but this is typically done only for internal debugging purposes. An activity switch may also be generated by entering a software command.

In addition to control and data plane cards, the router also includes various-external modules or "off-card" assemblies or cards that may be plugged into (or unplugged from) the system. They are physically separated from the control planes but connect to them once they are inserted into the system. Typically, an off-card assembly terminates the control path and the data path.

One problem with current control plane management schemes is that they cannot typically detect and respond quickly enough to changes on multiple off-card assemblies, particularly when an activity switch is required in a high availability system in order to maintain stringent customer service level agreements. This problem causes the following: loss of bandwidth resulting from control plane traffic timing out when the status from an off-card assembly changes (or has been removed) and cannot be responded to efficiently; and, loss of reliability resulting from unauthorized write accesses to the off-card assembly from the inactive control plane. In addition, off-card assemblies cannot quickly detect and react to an activity switch in order to optimize performance of the active control plane and hence maintain bandwidth.

Another problem with current control plane management schemes relates to reset mechanisms. Control plane cards and off-card assemblies are typically provided with reset mechanisms which may be based, for example, on the power provided to the card. Until a card is properly powered-up and its alimentation (i.e., support and maintenance) is stable, a reset line or pin is kept low hence keeping the card in a reset state. The use of such reset mechanisms in high availability systems can be problematic. First, in general, existing reset mechanisms cannot target resets to a subset of the logic on a control plane or on an off-card assembly. This prevents the core logic from staying in-service during an activity switch or a failure and can result in increased recovery time (which is contrary to the objective of a high availability system). Second, existing reset mechanisms cannot detect and respond to changes in conditions in a timely fashion, which is important for high availability systems (i.e., to maintain customer service level agreements). Third, existing reset mechanisms cannot properly handle independent reset instructions from redundant control planes, thereby preventing resolution of conflicts and leading to false resets. Fourth, existing reset mechanisms use many signals to distribute reset instructions to multiple off-card assemblies. This increases package pin count, which leads to increased system cost.

A need therefore exists for an improved method and system for control plane signaling in high availability network devices such as routers. Accordingly, a solution that addresses, at least in part, the above and other shortcomings is desired.

SUMMARY OF THE INVENTION

According to one aspect of the invention, there is provided a method for resetting a component of an off-card assembly in a redundant system, the redundant system having first and second control plane cards coupled to the off-card assembly by respective serial interfaces, each serial interface including a respective status line and a respective clock line, each status line for providing a respective activity indication and a respective reset instruction, each clock line for providing a respective clock signal, the method comprising: monitoring respective activity indications and clock signals from the first and second control plane cards by the off-card assembly to determine which of the first and second control plane cards is an active card; and, selecting the reset instruction from the active card to reset the component, thereby resolving any conflict between respective reset instructions.

In the above method, at least one of the activity indication and the reset instruction may be encoded. The method may further include decoding at least one of the activity indication and the reset instruction. The component may be the off-card assembly itself. The method may further include de-bouncing at least one of the activity indication and the reset instruction. The component may include one or more components. The reset instruction may specify the component. Each serial interface may include a bi-directional frame pulse line and one or more bi-directional data lines. The redundant system may be a network device. And, the network device may be a router.

According to another aspect of the invention, there is provided a method for resetting a component of an off-card assembly in a redundant system, the redundant system having first and second control plane cards coupled to the off-card assembly by respective serial interfaces, each serial interface including a respective status line and a respective clock line, each status line for providing a respective activity indication and a respective reset instruction, each clock line for providing a respective clock signal, the method comprising: monitoring respective activity indications and clock signals from the first and second control plane cards by the off-card assembly to determine whether the first and second control plane cards are present; and, if at least one of the first and second control plane cards is not present, selecting an off-card assembly based reset instruction to reset the component.

According to another aspect of the invention, there is provided a method for prioritizing respective messages sent to an off-card assembly from first and second control plane cards in a redundant system, the first and second control plane cards coupled to the off-card assembly by respective serial interfaces, each serial interface including a respective status line and a respective clock line, each status line for providing a respective activity indication, each clock line for providing a respective clock signal, the method comprising: monitoring respective activity indications and clock signals from the first and second control plane cards by the off-card assembly to determine which of the first and second control plane cards is an active card; and, assigning a higher priority to messages from the active card, thereby resolving any conflict between the respective messages from the first and second control plane cards.

In accordance with further aspects of the present invention there is provided an apparatus such as a processor, a method for adapting this processor, as well as articles of manufacture such as a computer readable medium having program instructions recorded thereon for practicing the method of the invention.

BRIEF DESCRIPTION OF THE DRAWINGS

Features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain instruction modules, circuits, structures and techniques have not been described or shown in detail in order not to obscure the invention.

One of the challenges in designing a state-of-the-art distributed control plane in a high availability system is to quickly gather information from each off-card assembly including the activity of each control card and to use this information efficiently to optimize the performance of the control plane. Control plane bandwidth is usually the bottleneck with respect to the number of customer profiles that the system can handle (e.g., deep channelized) or to the number of off-card assemblies. When considering datapath traffic, the user wants to configure channels and sub-channels in order to offer a high level of service to customers, and therefore maximize profits. The more channels a network device has, the more links (i.e., channels) that need to be monitored and controlled. Accordingly, deep channelized off-card assemblies require a lot of control path accesses to monitor all the links. In such devices it is then critical to optimize those accesses in order to maximize the bandwidth and therefore the number of links that can be monitored. Furthermore, high availability systems have to provide quick detection, quick reaction, and flexibility to ensure that they meet the level of service that users and their customers demand.

As will be described below, the present invention meets several of these challenges by providing the following: continuous monitoring of the status of each off-card assembly and the activity of each control card; early discard of control plane traffic; and, access control for off-card assemblies based on activity and time-based prioritization of access. The present invention may be implemented in a highly modular network device, such as a router, where each control plane and off-card assembly may be removed or inserted at any time.

In redundant systems, a serial interface protocol may be used to link two masters (i.e., redundant control planes or cards) with multiple slaves (i.e., off-card assemblies). The physical interface may include a bi-directional frame pulse link and four bi-directional data links. A serial interface protocol is a means to communicate between two devices (e.g., device A and device B) through an interface. To establish the communication, physical links (e.g., lines or wires) are used to transmit the information. One wire is used to transmit a frame pulse and four wires to are used to transmit data. A frame pulse is generated by the transmitter in order to tell the receiver when a new frame (request) begins. The data lines contain the request and are valid right after the frame pulse. Now both devices can transmit and receive information. In order to keep the interface as small as possible (i.e., minimize the number of wires), each of the frame pulse link and data links are bi-directional. In this way, only one frame pulse and four data wires are required to connect device A to device B and device B to device A. Both devices A and B transmit their respective frame pulses on the same wire. Access to the frame pulse link is arbitrated between devices A and B so that both devices A and B do not send a frame pulse or data at the same time.

According to one embodiment, this serial interface protocol is expanded by the addition of a status line and a clock line to gather the information necessary to achieve high availability system performance. Hardware processing of the information allows quick detection and reaction. In addition, debounce mechanisms and redundant control information are used to ensure a high level of reliability.

Figure 1:
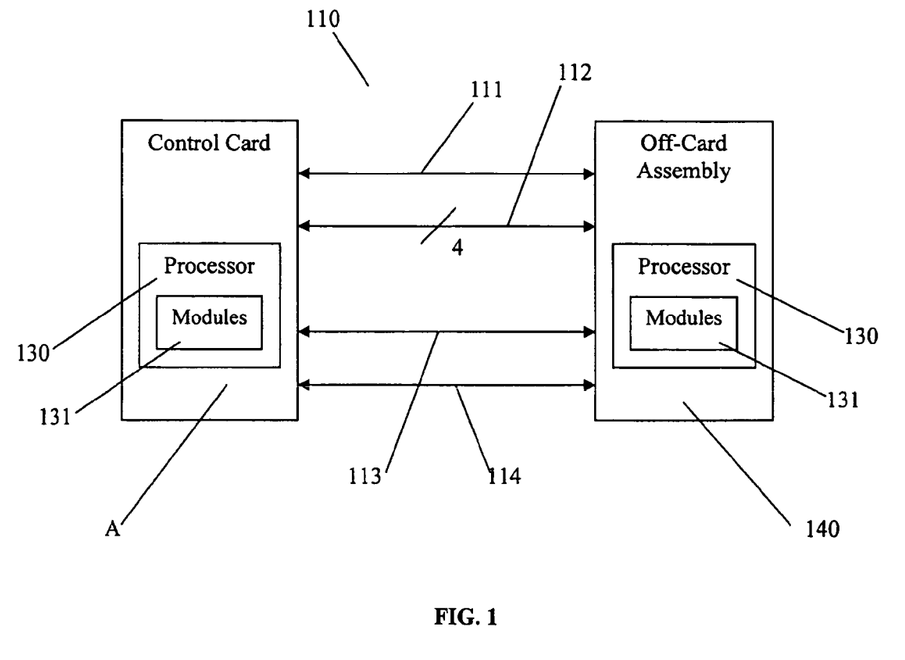
FIG. 1 is a block diagram illustrating a serial interface between a control plane card and an off-card assembly in accordance with an embodiment of the invention.
Figure 2:
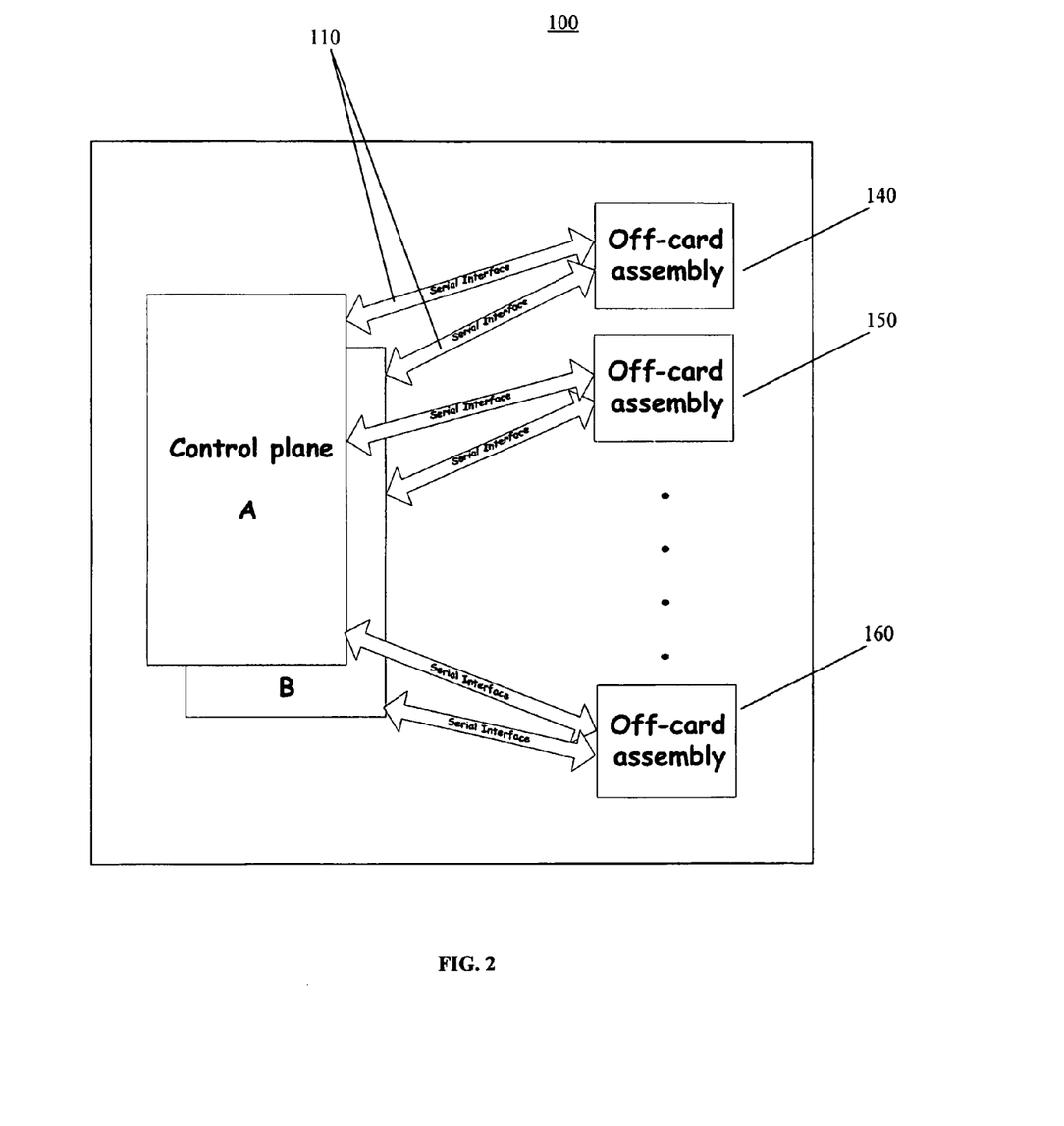
FIG. 2 is a block diagram illustrating a network device having the serial interface of FIG. 1 between control plane cards and off-card assemblies in accordance with an embodiment of the invention.

FIG. 1 is a block diagram illustrating a serial interface 110 between a control plane card A and an off-card assembly 140 in accordance with an embodiment of the invention. And, FIG. 2 is a block diagram illustrating a network device 100 having the serial interface 110 of FIG. 1 between control plane cards A, B and off-card assemblies 140, 150, 160 in accordance with an embodiment of the invention. As shown in FIG. 1, the serial interface 110 of the present invention has a bi-directional frame pulse line 111, four bi-directional data lines 112, a bi-directional status line 113, and a bi-directional clock line 114. As shown in FIG. 2, a serial interface 110 is provided between an off-card assembly (e.g., 140) and each of the redundant pair of control cards A, B. Each control plane card A, B monitors the status of each off-card assembly 140, 150, 160 and provides early discard of control plane traffic. Each off-card assembly 140, 150, 160 monitors control plane A, B activity and provides access control and prioritization. Each serial interface 110 includes a frame pulse line 111, four data lines 112, and the status and clock lines 113, 114 of the present invention. Each control plane card A, B and each off-card assembly 140, 150, 160 includes a respective mechanism or processor 130 for implementing the present invention.

The status line 113 drives a specific pattern, which is repeated over and over. The pattern includes bits of information including the following: an activity indication, a reset instruction, and a reserved for future use ("RFU") indication instruction. The pattern is confirmed as being correct and is de-bounced before the information is considered to be valid. Thus, both the activity indication and reset instruction are encoded for transmission on the status line 113. The status line 113 is a one bit line that is used to send more than one bit of information. The way this is accomplished is through the use of a repeated serial pattern and encoding of information. For example, the repeated pattern may be "0111". If an activity indication and a reset instruction are to be sent, the following sequence is sent on the status line 113: "0111 A R ... 0111 A R ... 0111 A R", where "A" is the activity indication and "R" is the reset instruction. This pattern may be repeated again and again. Furthermore, additional bits may be added so that more than one reset instruction may be sent on the same status line 113. For example, the "R" in the above example may be replaced with "R1", "R1", ..., "RX", for sending "X" different reset instructions. Aspects of the present invention relating to reset instructions will be described in more detail below.

The control plane (e.g., A) checks the presence of the off-card assembly (e.g., 140) with a presence detection mechanism implemented by a processor 130 before processing a message, resulting in early discards and avoiding accesses to time-out if the assembly 140 is not present. The message may be any kind of access that the control plane A needs to send across the serial interface 110. It is usually a write or a read request to a field programmable gate array ("FPGA") in the off-card assembly 140. The presence detection mechanism is based on the clock 114 received from the off-card assembly 140 and its status line 113. A valid clock signal and a valid status pattern are required to declare the off-card assembly 140 present.

The off-card assembly 140 checks the activity indication received on the status lines 113 from both control planes A, B with an activity detection mechanism (implemented by a processor 130) and processes the information to resolve conflict cases such as two inactive or two active control planes A, B. The off-card assembly 140 then allows write accesses from only the active control plane (e.g., A). Unauthorized accesses are discarded. In addition, based on the same activity indications, the off-card assembly 140 prioritizes the accesses from the active control plane (e.g., A), resulting in better performance. This is important since accesses from the active control plane (e.g., A) are generally much more frequent.

The presence detection mechanism and the activity detection mechanism are generally implemented in hardware (e.g., by processor 130). However, these mechanisms maybe implemented in software. The main difference between hardware and software processing is that hardware is much faster as the information doesn't have to propagate to the software. It is important in a high available system to respond quickly to any event in order to keep the system up and running.

This embodiment of the invention provides several advantages. First, the invention provides fast hardware access control for high availability systems improving the performance of the active control plane, which allows the system to efficiently manage more customer profiles and hence provide improved service levels. Second, the invention enables fast control plane traffic filtering for early traffic discarding. This allows for a minimization of the number of accesses that time-out in a system 100 with many off-card assemblies 140, 150, 160, that could be removed and inserted at any time, and therefore for a maximization of the bandwidth and the number of customer profiles that may be handled. Third, the pin count of the interface between control cards A, B and off-card assemblies 140, 150, 160 is lowered as the detection mechanism is embedded in the serial interface protocol. This is important for a system 100 that includes many off-card assemblies 140, 150, 160 as it may reduce the price of the package required, minimizing the cost of goods sold, which maximizes profit for the system manufacturer. Recall that for communications between two modules, a physical link or wires between them is required. The number of wires needed to connect all the cards and assemblies in the system is important and each wire carries a cost. Therefore, the present invention provides cost savings by minimizing the number of pins or wires per interface. To achieve this, a single pin or wire is used to transmit different information.

Now, control cards A, B and off-card assemblies 140, 150, 160 are typically provided with reset mechanisms. A reset mechanism could be based on the power provided to the card, for example. Until a card is properly powered-up and its alimentation (i.e., support and maintenance) is stable, a reset line or pin is kept low hence keeping the card in a reset state. In this example, the reset mechanism is a line or pin which controls the entire card. A reset signal is a signal that is applied to a reset line or pin of a card. The reset signal may be a low or high voltage. A processor or other logic monitors the voltage level (i.e., low or high) on the reset pin and decides whether to reset the card or not. A high availability system 100 may include multiple reset signals, each signal controlling the reset for some part of the system. In such a system, reset instructions may be used. A reset instruction is an instruction that may be encoded and sent across an interface 110 from a first device (e.g., A) to a second device (e.g., 140) where it is decoded and used to initiate a reset operation (e.g., generate a local reset signal).

However, there are several problems in using existing reset mechanisms in high availability systems 100. First, in general, existing reset mechanisms cannot target resets to a subset of the logic on a control plane A, B or on an off-card assembly 140, 150, 160. This prevents the core logic from staying in-service during an activity switch or a failure and can result in increased recovery time (which is contrary to the objective of a high availability system). Second, existing reset mechanisms cannot detect and respond to changes in conditions in a timely fashion, which is important for high availability systems (i.e., to maintain customer service level agreements). Third, existing reset mechanisms cannot properly handle independent reset instructions from redundant control planes A, B, thereby preventing resolution of conflicts and leading to false resets. Fourth, existing reset mechanisms use many signals to distribute reset instructions to multiple off-card assemblies 140, 150, 160. This increases package pin count, which leads to increased system cost, as described above.

According to one embodiment of the invention, a intelligent distributed reset mechanism is provided for optimizing high availability network devices 100. Advantageously, the reset mechanism of the present invention is able to detect and respond quickly to any change in conditions and to reset only what is necessary to recover from a failure or an activity switch in order to keep the system 100 up and running. For example, the reset mechanism of the present invention may reset only a subset of an off-card assembly 140, 150, 160 or control plane A, B. Partial resetting saves time and allows the high availability system 100 to meet demanding service level agreements that call for high availability under all conditions. In addition, the reset mechanism of the present invention can reliably resolve simultaneous reset instructions from both control planes A, B which reduces the occurrence of false resets. Furthermore, the reset mechanism of the present invention is flexible yet distributes resets efficiently with reduced wiring.

Figure 3:
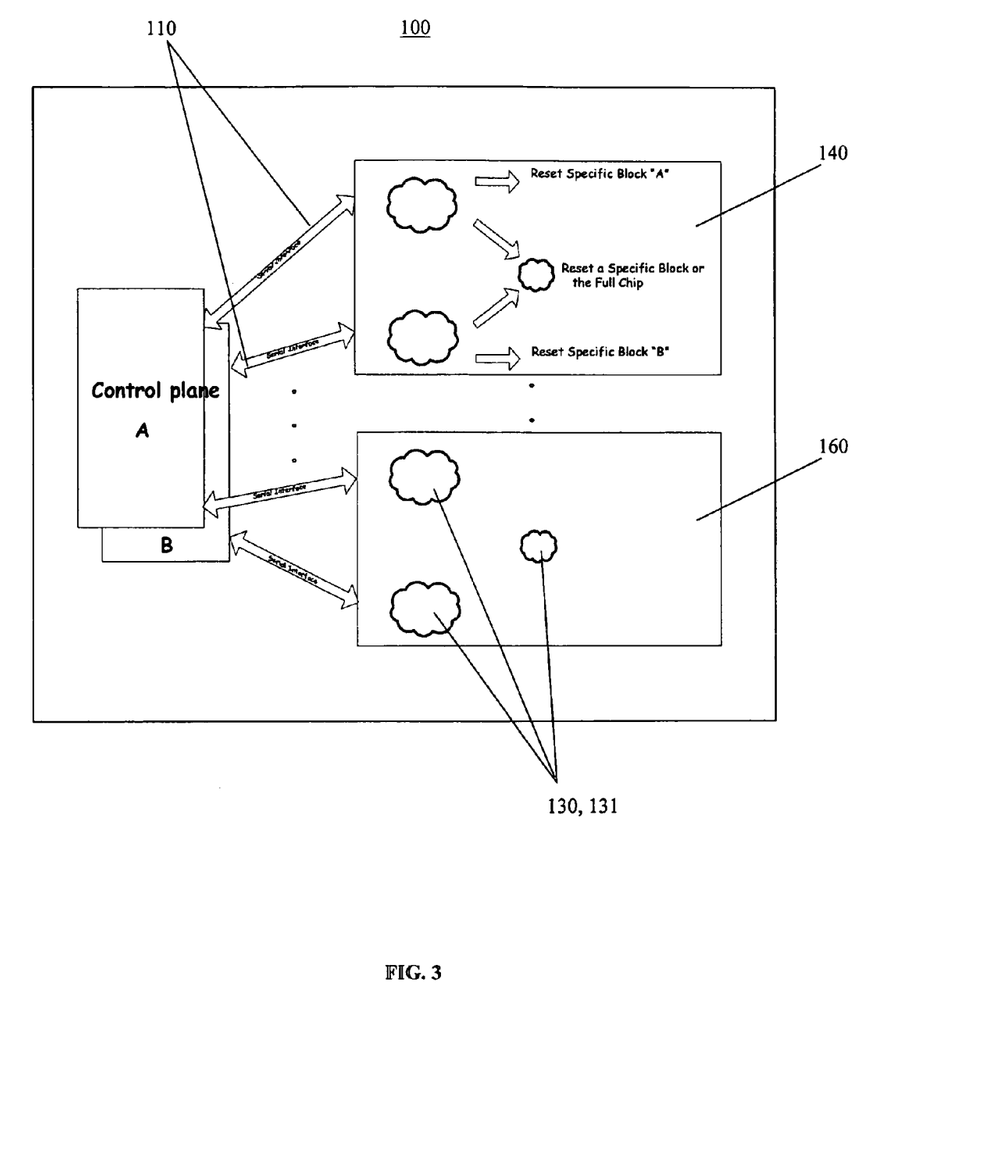
FIG. 3 is a block diagram illustrating a network device having a reset mechanism and the serial interface of FIG. 1 between control plane cards and off-card assemblies in accordance with an embodiment of the invention; and, FIG. 4 is a flow chart illustrating operations of modules within a processor for resetting a component of an off-card assembly in a redundant system, the redundant system having first and second control plane cards coupled to the off-card assembly by respective serial interfaces, each serial interface including a respective status line and a respective clock line, each status line for providing a respective activity indication and a respective reset instruction, each clock line for providing a respective clock signal, in accordance with an embodiment of the invention.

FIG. 3 is a block diagram illustrating a network device 100 having a reset mechanism and the serial interface 110 of FIG. 1 between control plane cards A, B and off-card assemblies 140, 160 in accordance with an embodiment of the invention. In FIG. 3, a serial interface 110 is used to connect the redundant control planes A, B to the off-card assemblies 140, 160. The serial interface 110 includes a status line 113 and a clock line 114 in order to recover data more easily and to transport additional information such as presence, activity, interrupts, etc. To keep a low pin count, reset instructions are also distributed using the status and clock lines 113, 114 of the serial interface 110, thus adding an additional function to those signals without sacrificing their original functions as described above.

Each off-card assembly 140, 160 has a reset mechanism and a presence detection mechanism implemented by a processor 130. With respect to the reset mechanism, each off-card assembly continuously analyses activity and reset instructions received from both control planes A, B and eventually discards the reset instruction from the inactive control plane (e.g., B). The status line 113 drives a specific pattern that includes (i.e., for the reset mechanism) an activity indication and a reset instruction. This pattern may be extended to transmit as many reset instructions as needed to control subsets of the off-card logic. To ensure a high level of reliability, each assembly 140, 160 decodes and de-bounces (for several cycles) the status message received from the control planes A, B. Based on the activity indication and the reset instruction, a full chip or specific blocks of the chip on an off-card assembly (e.g., 140) are reset. The activity indication and reset instruction are processed by a hardware mechanism or processor 130 on the off-card assembly 140, 160. The hardware mechanism 130 may be a field programmable gate array ("FPGA") or other processor and may include logic or instruction modules 131 for performing various functions (e.g., the reset mechanism, the presence detection mechanism). The hardware mechanism or processor 130 functions to resolve conflicts in the instructions received from the redundant control planes A, B and to respond quickly in order to minimize down time.

With respect to the presence detection mechanism, each off-card assembly 140, 160 continuously monitors the presence of each control plane A, B. Presence detection is based on the clock 114 received from the control plane (e.g., A) and its status line 113. A valid clock 114 and a valid status pattern 113 are needed to declare the control plane (e.g., A) present. Based on the presence detected, the off-card assembly (e.g., 140) generates its own reset, either to specific blocks (e.g., Block "A" or Block "B" as shown in FIG. 3) of the chip on the off-card assembly 140 if only one control plane (e.g., B) is missing or to the full chip if both control planes A, B are missing or not functioning. Note that Block "A" and Block "B" maybe logic or instruction modules 131 within the processor 130 or may represent other devices or chips on the off-card assembly 140.

This invention also provides the control plane (e.g., A) with the ability to generate its own reset for specific blocks when an off-card assembly 140, 160 is not present. The presence detection mechanism for the control plane (e.g., A) is the same that the one used on the off-card assembly (e.g., 140) to detect the presence of the control plane A. This allows the system 100 to come up running much faster when an off-card assembly 140 is inserted, maximizing the up-time of the system 100 and keeping the other off-card assemblies 160 up and running.

Thus, this embodiment of the invention is directed toward resetting subsystems (e.g., 140, 160) in a redundant system 100. In particular, a subsystem (e.g., off-card assembly 140, 160) monitors redundant control planes A, B of the system 100 via respective serial interfaces 110 that comprise a status signal 113 and a clock signal 114, the status signal 113 for carrying an activity indication and a reset instruction. Responsive to the activity indication and reset instruction received on each of the serial interfaces 110, the subsystem 140, 160 resets components or parts of components of the subsystem 140, 160. The subsystem 140, 160 decodes and de-bounces activity indications and reset instructions received over several cycles of the clock signal. The status signal may carry activity indications and rest instructions for a plurality of components and parts of components (subsets of off-card logic). Each subsystem 140, 160 includes means for resolving conflicts in the instructions received from the redundant control planes and responding quickly to the instructions. All of the above functionality may also be present in the control planes A, B for monitoring the subsystem(s) 140, 160.

This embodiment of the invention provides several advantages. First, it allows for fast recovery from a failure or from an activity switch. Second, it enables a targeted reset to the off-card assemblies 140, 160 minimizing the effect on the core logic and therefore maximizing the up-time for the high availability system 100. Third, it minimizes the number of pins needed to distribute reset instructions to off-card assemblies 140, 160. Typically, this means that FPGA packages used will cost less which leads to lower system costs.

The processors 130 shown in FIGS. 1-3 are adapted to implement an embodiment of the invention. Each processor 130 may include a central processing unit ("CPU") (not shown), memory or instruction modules 131, and an interface device (not shown). The CPU may include dedicated coprocessors and memory devices. The interface device may include a serial interface 110 connection and/or a network (not shown) connection. Each processor 130 is adapted for communicating with other systems (e.g., A, B, 120, 130, 140) over a serial interface 110 or network via the interface device 350. The processor 130 may include a database system (not shown) for storing and accessing system topology and programming information. The database system may include a database management system ("DBMS") (not shown) and a database (not shown) and may be stored in the memory or instruction modules 131 of the processor 130. The process 130 has stored therein data representing sequences of instructions which when executed cause the method described herein to be performed. Of course, the processor 300 may contain additional instructions and hardware a description of which is not necessary for understanding the invention.

Thus, the processor 130 includes executable programmed instructions for directing the process 130 to implement the embodiments of the present invention. The programmed instructions may be embodied in one or more instruction modules 131 resident in the processor 130. Alternatively, the programmed instructions may be embodied on a computer readable medium (such as a CD disk or floppy disk) which may be used for transporting the programmed instructions to the processor 130. Alternatively, the programmed instructions may be embedded in a computer-readable, signal or signal-bearing medium that is uploaded to a network by a vendor or supplier of the programmed instructions, and this signal or signal-bearing medium may be downloaded through an interface to the processor 130 from the network by end users or potential buyers.

Figure 4:
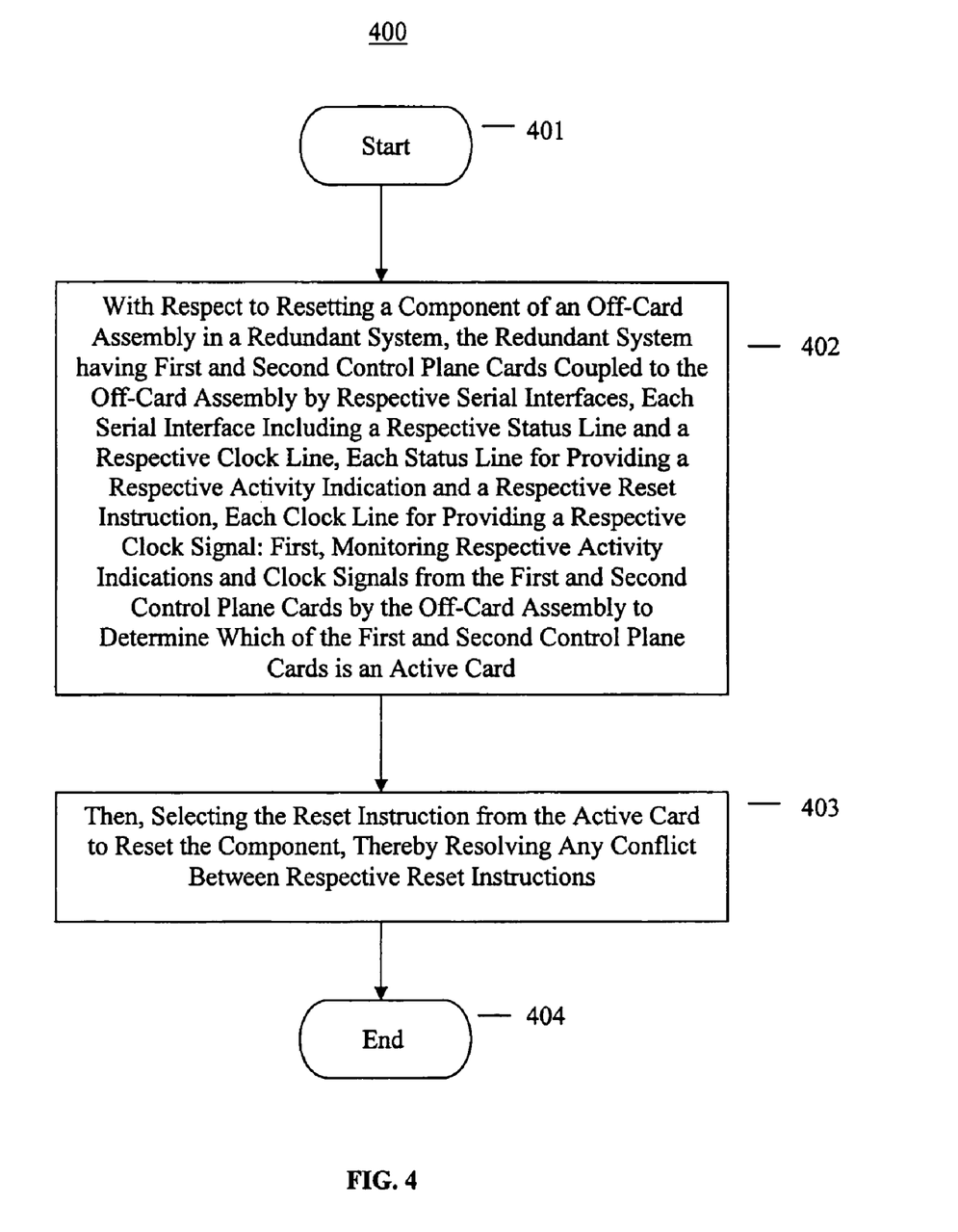

The above described method may be summarized with the aid of a flowchart. FIG. 4 is a flow chart illustrating operations 400 of modules 131 within a processor 130 for resetting a component of an off-card assembly (e.g., 140) in a redundant system 100, the redundant system 100 having first and second control plane cards A, B coupled to the off-card assembly 140 by respective serial interfaces 110, each serial interface 110 including a respective status line 113 and a respective clock line 114, each status line 113 for providing a respective activity indication and a respective reset instruction, each clock line 114 for providing a respective clock signal, in accordance with an embodiment of the invention.

At step 401, the operations 400 start.

At step 402, respective activity indications and clock signals from the first and second control plane cards A, B are monitored by the off-card assembly 140 to determine which of the first and second control plane cards A, B is an active card (e.g., A).

At step 403, the reset instruction from the active card A is selected to reset the component, thereby resolving any conflict between respective reset instructions.

At step 404, the operations 400 end.

In the above method, at least one of the activity indication and the reset instruction may be encoded. The method may further include decoding at least one of the activity indication and the reset instruction. The component may be the off-card assembly 140 itself. The method may further include de-bouncing at least one of the activity indication and the reset instruction. The component may include one or more components. The reset instruction may specify the component. Each serial interface 110 may include a bi-directional frame pulse line 111 and one or more bi-directional data lines 112. The redundant system 100 maybe a network device. And, the network device 100 maybe a router.

While this invention is primarily discussed as a method, a person of ordinary skill in the art will understand that the apparatus discussed above with reference to a processor 130, may be programmed to enable the practice of the method of the invention. Moreover, an article of manufacture for use with a processor 130, such as a pre-recorded storage device or other similar computer readable medium including program instructions recorded thereon, may direct the processor 130 to facilitate the practice of the method of the invention. It is understood that such apparatus and articles of manufacture also come within the scope of the invention.

In particular, the sequences of instructions which when executed cause the method described herein to be performed by the processor 130 of FIGS. 1 and 3 can be contained in a data carrier product according to one embodiment of the invention. This data carrier product can be loaded into and run by the processor 130. In addition, the sequences of instructions which when executed cause the method described herein to be performed by the processor 130 can be contained in a computer software product according to one embodiment of the invention. This computer software product can be loaded into and run by the processor 130. Moreover, the sequences of instructions which when executed cause the method described herein to be performed by the processor 130 can be contained in an integrated circuit product including a coprocessor or memory according to one embodiment of the invention. This integrated circuit product can be installed in the processor 130.

The embodiments of the invention described above are intended to be exemplary only. Those skilled in this art will understand that various modifications of detail may be made to these embodiments, all of which come within the scope of the invention.

What is claimed is:

1. A method for resetting a component of an off-card assembly in a redundant system, the redundant system having first and second control plane cards coupled to the off-card assembly by respective serial interfaces, each serial interface including a respective status line and a respective clock line, each status line for providing a respective activity indication and a respective reset instruction, each clock line for providing a respective clock signal, the method comprising:

monitoring respective activity indications and clock signals from the first and second control plane cards by the off-card assembly to determine which of the first and second control plane cards is an active card; and, selecting the reset instruction from the active card to reset the component, thereby resolving any conflict between respective reset instructions.

2. The method of claim 1 wherein at least one of the activity indication and the reset instruction is encoded.

3. The method of claim 2 and further comprising decoding at least one of the activity indication and the reset instruction.

4. The method of claim 1 wherein the component is the off-card assembly.

5. The method of claim 1 and further comprising de-bouncing at least one of the activity indication and the reset instruction.

6. The method of claim 1 wherein the component is one or more components.

7. The method of claim 6 wherein the reset instruction specifies the component.

8. The method of claim 1 wherein each serial interface includes a bi-directional frame pulse line and one or more bi-directional data lines.

9. The method of claim 1 wherein the redundant system is a network device.

10. The method of claim 9 wherein the network device is a router.

11. A processor for resetting a component of an off-card assembly in a redundant system, the redundant system having first and second control plane cards coupled to the off-card assembly by respective serial interfaces, each serial interface including a respective status line and a respective clock line, each status line for providing a respective activity indication and a respective reset instruction, each clock line for providing a respective clock signal, the processor comprising:
- a module having instructions for monitoring respective activity indications and clock signals from the first and second control plane cards to determine which of the first and second control plane cards is an active card; and,
- a module having instructions for selecting the reset instruction from the active card to reset the component, thereby resolving any conflict between respective reset instructions.

12. The processor of claim 11 wherein at least one of the activity indication and the reset instruction is encoded.

13. The processor of claim 12 and further comprising a module having instructions for decoding at least one of the activity indication and the reset instruction.

14. The processor of claim 11 wherein the component is the off-card assembly.

15. The processor of claim 11 and further comprising a module having instructions for de-bouncing at least one of the activity indication and the reset instruction.

16. The processor of claim 11 wherein the component is one or more components.

17. The processor of claim 16 wherein the reset instruction specifies the component.

18. The processor of claim 11 wherein each serial interface includes a bi-directional frame pulse line and one or more bi-directional data lines.

19. The processor of claim 11 wherein the redundant system is a network device.

20. The processor of claim 19 wherein the network device is a router.

21. A method for resetting a component of an off-card assembly in a redundant system, the redundant system having first and second control plane cards coupled to the off-card assembly by respective serial interfaces, each serial interface including a respective status line and a respective clock line, each status line for providing a respective activity indication and a respective reset instruction, each clock line for providing a respective clock signal, the method comprising:
- monitoring respective activity indications and clock signals from the first and second control plane cards by the off-card assembly to determine whether the first and second control plane cards are present; and,
- if at least one of the first and second control plane cards is not present, selecting an off-card assembly based reset instruction to reset the component.

22. A method for prioritizing respective messages sent to an off-card assembly from first and second control plane cards in a redundant system, the first and second control plane cards coupled to the off-card assembly by respective serial interfaces, each serial interface including a respective status line and a respective clock line, each status line for providing a respective activity indication, each clock line for providing a respective clock signal. the method comprising:
- monitoring respective activity indications and clock signals from the first and second control plane cards by the off-card assembly to determine which of the first and second control plane cards is an active card; and,
- assigning a higher priority to messages from the active card, thereby resolving any conflict between the respective messages from the first and second control plane cards.

* * * * *